United States Patent [19]

Ishigaki et al.

[11] Patent Number: 5,354,618
[45] Date of Patent: Oct. 11, 1994

[54] THERMOPLASTIC RESIN COMPOSITION AND PAINT-COATED MOLDED PRODUCT THEREOF

[75] Inventors: Satoru Ishigaki; Yutaka Yokoyama; Yukihiro Hisanaga; Zenichiro Izumi; Nobuyuki Mitarai; Kouichi Yamamoto, all of Oita, Japan

[73] Assignee: Showa Denko K.K., Tokyo, Japan

[21] Appl. No.: 36,864

[22] Filed: Mar. 25, 1993

[30] Foreign Application Priority Data

| Mar. 25, 1992 | [JP] | Japan | 4-098811 |
| Apr. 9, 1992 | [JP] | Japan | 4-117023 |
| Aug. 7, 1992 | [JP] | Japan | 4-211750 |
| Sep. 17, 1992 | [JP] | Japan | 4-247993 |

[51] Int. Cl.⁵ .................. C08L 51/06; C08L 33/00; C08F 8/00
[52] U.S. Cl. .................. 428/424.8; 525/78; 525/79; 525/192; 525/193; 525/194; 525/195; 525/196
[58] Field of Search .......... 525/79, 78, 71, 70, 525/75, 193, 192, 194, 196; 428/424.8

[56] References Cited

U.S. PATENT DOCUMENTS

| 4,237,037 | 12/1980 | Takahashi | 525/79 |
| 4,683,266 | 7/1987 | Palermo et al. | 525/75 |
| 4,908,412 | 3/1990 | Otawa et al. | 525/286 |
| 4,957,968 | 9/1990 | Adur et al. | 525/79 |
| 5,196,270 | 3/1993 | Kitagawa et al. | 525/78 |

FOREIGN PATENT DOCUMENTS

| 0336780 | 10/1989 | European Pat. Off. |
| 0429236 | 5/1991 | European Pat. Off. |
| 58-191706 | 11/1983 | Japan |
| 60-55012 | 3/1985 | Japan |
| 60-55052 | 3/1985 | Japan |
| 3-151768 | 6/1991 | Japan |
| 3-151769 | 6/1991 | Japan |
| 3157168 | 7/1991 | Japan |
| 3157169 | 7/1991 | Japan |
| 4-272938 | 9/1992 | Japan |
| 4-272948 | 9/1992 | Japan |

OTHER PUBLICATIONS

Database WPAT, Accession No. 92-370579/45, Derwent Publ. Ltd., (Abstract of JP04272948-A).
Database WPAT, Accession No. 92-370571/45, Derwent Publ. Ltd., (Abstract of JP04272938-A).
Database WPAT, Accession No. 85-113535/19, Derwent Publ. Ltd., (Abstract of JP60055052).
Database WPAT, Accession No. 85-113504/19, Derwent Publ. Ltd., (Abstract of J60055012).
Database WPAT, Accession No. 83-846831/51, Derwent Publ. Ltd., (Abstract of J58191706).

*Primary Examiner*—James J. Seidleck
*Assistant Examiner*—M. L. Warzel
*Attorney, Agent, or Firm*—Sughrue, Mion, Zinn, Macpeak & Seas

[57] ABSTRACT

A thermoplastic resin composition having good coating affinity is disclosed, which comprises (a) from 20 to 80 parts by weight of a resin component containing a modified polyolefin resin which has been graft-modified with an unsaturated hydroxy group-containing compound or an unsaturated carboxylic acid, (b) from 80 to 20 pats by weight of a rubber component containing a copolymer rubber, and (c) a functional group-terminated oligomer in an amount of from 0.1 to 20 parts by weight per 100 parts by weight of the sum of components (a) and (b).

19 Claims, No Drawings

THERMOPLASTIC RESIN COMPOSITION AND PAINT-COATED MOLDED PRODUCT THEREOF

FIELD OF THE INVENTION

The present invention relates to a polyolefin-based thermoplastic resin composition having excellent coating affinity and a paint-coated molded product obtained therefrom. More particularly, this invention relates to a polyolefin-based thermoplastic resin composition which can be coated without the necessity of either trichloroethane treatment or primer treatment, and to a paint-coated molded product obtained from the composition.

BACKGROUND OF THE INVENTION

Polyolefin-based thermoplastic resin compositions show excellent moldability in various molding processes, and they are used for interior or exterior parts of transporting means including automobiles and vessels and for various structural materials in various industrial fields such as household electric appliances, office machines and tools, furniture, living necessaries, miscellaneous goods, and building. A coating is often applied on molded products of these thermoplastic resin compositions for such purposes as surface protection and coloring. However, since polyolefin-based thermoplastic resin compositions are nonpolar materials having poor affinity for coatings, various pretreatments are required for the coating of these resin compositions. Generally known as such pretreatments are primer treatment, corona treatment, and the like.

The primer treatment is a technique of coating a molded product of a polyolefin-based thermoplastic resin composition with a compound, such as a chlorinated polyolefin, having an affinity for both the thermoplastic resin composition and a coating to be applied, thereby to improve the affinity of the molded product for the coating.

However, primers are expensive, and the use thereof necessitates a high-temperature and time-consuming drying step for solvent volatilization because they contain a solvent in a large amount. The primer treatment is also disadvantageous in that a pretreatment with a vapor of trichloroethane (TCE) should be conducted prior to application of a primer so as to improve the adhesion of the primer to the molded product. The primer treatment has these drawbacks and, in particular, the use of TCE is coming to be regulated in recent years because of environmental pollution problems.

The corona discharge treatment is a technique of modifying the surface of a molded product to improve the affinity of the molded product for a coating to be applied. This treatment, however, is disadvantageous in that the molded product is limited in shape and that an investment in the treating equipment is necessary.

If coatings can be directly applied to molded products of thermoplastic resin compositions without either of these treatments, not only a coating process can be shortened, but also coated products can be provided without using harmful substances such as solvents and TCE. Thus, the direct coating is very preferable in that the number of steps can be reduced and equipment investment is unnecessary.

It has been attempted to improve the coating affinity of thermoplastic resin compositions, as described in European Patent 336780. The European Patent discloses a method in which a mixture consisting of a peroxide-crosslinkable olefin copolymer rubber, an olefin-based resin, and a monomer having one or more amino groups is dynamically treated with an organic peroxide at an elevated temperature and the thus-obtained thermoplastic resin composition is blended with an unsaturated carboxylic acid derivative with heating. The European Patent also discloses a method in which a mixture consisting of a peroxide-crosslinkable olefin copolymer rubber, an olefin-based resin, and an unsaturated carboxylic acid or a derivative thereof is dynamically treated with an organic peroxide at an elevated temperature and the thus-obtained thermoplastic resin composition is blended, with heating, with a monomer having one or more amino groups. However, these techniques fail to sufficiently improves coating affinity, and satisfactory coating adhesion strength can not be attained.

A thermoplastic resin composition modified with a hydroxyl group-containing compound is disclosed, for example, in U.S. Pat. 4,908,412. This thermoplastic resin composition is prepared by a method in which a mixture of a peroxide-crosslinkable olefin copolymer rubber, an olefin-based resin, and an unsaturated epoxy group-containing monomer or an unsaturated hydroxy group-containing monomer is dynamically treated with an organic peroxide at an elevated temperature. However, this reference gives no description concerning the coating affinity of the thermoplastic resin composition.

Further, JP-A-58-191706, JP-A-60-55012, and JP-A-60-55052 (the term "JP-A" as used herein means an "unexamined published Japanese patent application") disclose a composition comprising a polypropylene modified with an unsaturated hydroxy group-containing compound, and an ethylene-propylene copolymer rubber. However, the coating adhesion strength of this composition is not always high.

As apparent from the above, when a coating is applied directly on molded products obtained from these resin compositions, peeling of the coating film is apt to occur. It is, therefore, difficult to attain a particular purpose, such as coloring or surface protection, without a pretreatment such as those described hereinabove.

JP-A-4-272938 and JP-A-4-272948 disclose resin compositions having improved coating affinity, which comprise a blend of a polyolefin resin with (i) a hydroxyl group-terminated diene polymer or a hydrogenation product thereof, or a copolymer of ethylene and a hydroxyl group-containing unsaturated compound, (ii) an organotin compound, and (iii) a tertiary amine compound, and further with a styrene-based or olefin-based (e.g., ethylene-based) elastomer as an optional ingredient. However, the coating affinity of these compositions is still unsatisfactory.

Coating methods and coated moldings are disclosed in JP-A-3-157168, JP-A-3-157169, and European Patent 429236. In these references, nonuse of a primer is clearly stated. However, TCE treatment is performed in most of these techniques and a satisfactory coated product cannot be obtained by any of these techniques without a pretreatment.

SUMMARY OF THE INVENTION

An object of the present invention is to provide a polyolefin-based thermoplastic resin composition which, after being molded, can be directly coated with a paint, especially a urethane coating without the necessity of conducting either of TCE treatment and primer treatment, and to provide a paint-coated product produced by applying a coating, specifically a urethane coating, on a molded product obtained from the composition.

The present inventors made intensive studies in order to obtain a thermoplastic resin composition having excellent coating affinity. As a result, the above object has been accomplished by a thermoplastic resin composition which comprises:

(a) from 20 to 80 parts by weight of a resin component containing at least a modified polyolefin resin which has been graft-modified with an unsaturated hydroxy group-containing compound or an unsaturated carboxylic acid, (b) from 80 to 20 parts by weight of a rubber component containing at least a copolymer rubber, and (c) a functional group-terminated oligomer in an amount of from 0.1 to 20 parts by weight per 100 parts by weight of the sum of components (a) and (b).

DETAILED DESCRIPTION OF THE INVENTION

The modified polyolefin resin contained in the resin component in the present invention is a polyolefin resin graft-modified with an unsaturated hydroxy group-containing compound or an unsaturated carboxylic acid compound (hereinafter referred to as modifying agent). The modified polyolefin resin is a major ingredient for enabling the thermoplastic resin composition of this invention to exhibit good affinity to a urethane coating film.

The modified polyolefin resin can be obtained by subjecting an unmodified polyolefin resin to heat treatment along with a modifying agent in the presence of an organic peroxide. Illustratively state, it can, for example, be prepared by mixing a polyolefin resin beforehand with an organic peroxide and a modifying agent by means of a Henschel mixer or other mixing device and then kneading the mixture in an ordinary kneading machine, such as a twin-screw extruder, single-screw extruder, or Banbury mixer, with heating. The kneading temperature varies depending on the kinds of the resin and organic peroxide used, but it is generally between 100° C. and 300° C.

Examples of the polyolefin resin to be modified include low-density polyethylene, high-density polyethylene, linear low-density polyethylene, polypropylene, ethylene-propylene block copolymers, ethylene-propylene random copolymers, polybutene, and mixtures thereof. Preferred examples having a high heat resistance are crystalline polypropylene resins such as propylene homopolymer, ethylene-propylene block copolymers, and ethylene-propylene random copolymers, and mixtures thereof. Of these, a resin containing at least either of an ethylene-propylene block copolymer and an ethylene-propylene random copolymer is especially preferred from the standpoint of attaining improved coating affinity.

The unmodified polyolefin resin generally has a flexural modulus of 1,000 kg/cm$^2$ or more.

The ethylene content in the ethylene-propylene random copolymer is preferably 20% by weight or lower. If the ethylene content exceeds 20% by weight, heat resistance tends to be impaired. From the standpoint of a balance between heat resistance and flexural modulus, the ethylene content in the ethylene-propylene random copolymer is preferably from 3 to 15% by weight, more preferably from 5 to 10% by weight.

The block copolymer and the random copolymer each may contains, as a comonomer unit, an α-olefin other than the ethylene unit and the propylene unit, in such an amount that the effect of the invention is not significantly impaired (generally 15% by weight or less, preferably 10% by weight or less based on the total weight of the monomers constituting the copolymer). Examples of the α-olefin include 1-butene, 3-methyl-1-butene, 4-methyl-1-butene, 4-methyl-1-pentene, 1-hexene, and 1-pentene.

Examples of the organic peroxide include dibenzoyl peroxide, p-chlorobenzoyl peroxide, dicumyl peroxide, di-t-butyl peroxide, t-butyl cumyl peroxide, 1,3-bis(t-butylperoxy)isopropylbenzene, 2,5-bis(t-butylperoxy)-2,5-dimethylhexane, 2,5-bis(t-butylperoxy)-2,5-dimethyl-3-hexyne, 1,1-bis(t-butylperoxy)-3,3,5-trimethylcyclohexane, and t-butyl peroxybenzoate. These compounds may have been diluted with an inert substance such as a plasticizer, calcium carbonate, white carbon, or the like. The amount of the organic peroxide to be used may be from 0.01 to 3 parts by weight per 100 parts by weight of the polyolefin resin. Preferably, the amount thereof is 0.2 part by weight or more for the purpose of increasing the graft amount of the modifying agent, and it is 2 parts by weight or less for preventing the polyolefin resin from undergoing excessive crosslinking or for preventing a molecular weight decrease.

Examples of the unsaturated hydroxy group-containing compound which may be employed as a modifying agent include hydroxyethyl acrylate, hydroxyethyl methacrylate, hydroxypropyl acrylate, hydroxypropyl methacrylate, poly(ethylene glycol) monoacrylate, poly(ethylene glycol) monomethacrylate, poly(propylene glycol) monoacrylate, poly(propylene glycol) monomethacrylate, glycerol mono- or diacrylate, glycerol mono- or dimethacrylate, trimethylolpropane mono- or diacrylate, trimethylolpropane mono- or dimethacrylate, ethylene glycol monoallyl ether, propylene glycol monoallyl ether, poly(ethylene glycol) monoallyl ether, poly(propylene glycol) monoallyl ether, o-, m-, and p-hydroxymethylstyrenes, and mixtures thereof.

In view of easiness of graft modification and especially good coating affinity, hydroxyethyl acrylate, hydroxyethyl methacrylate, hydroxypropyl acrylate, hydroxypropyl methacrylate, poly(ethylene glycol) monoacrylate having an oxyethylene chain polymerization degree of 10 or below, poly(ethylene glycol) monomethacrylate having an oxyethylene chain polymerization degree of 10 or below, poly(propylene glycol) monoacrylate having an oxyethylene chain polymerization degree of 10 or below, and poly(propylene glycol) monomethacrylate having an oxyethylene chain polymerization degree of 10 or below are preferred.

In another embodiment using the hydroxy group-containing modifying agent, the modified polyolefin resin is obtained by a method in which an unmodified polyolefin resin is graft-modified with an unsaturated compound not containing a hydroxyl group and a hydroxyl group is then incorporated into the grafted unsaturated compound through a chemical reaction. For example, the modified polyolefin resin may be a resin obtained by graft-modifying a polyolefin resin with an unsaturated dicarboxylic anhydride, e.g., maleic anhydride, and then reacting the modified resin with ethanolamine or the like to incorporate a hydroxyl group into the resin.

Examples of the unsaturated carboxylic acid compound as the other modifying agent include acrylic acid, methacrylic acid, crotonic acid, maleic acid, fumaric acid, iraconic acid, citraconic acid, tetrahydrophthalic acid, norbornene-5,6-dicarboxylic acid, and mixtures thereof.

In another embodiment using the unsaturated carboxylic acid compound, the modified polyolefin resin is obtained by a method in which an unmodified polyolefin resin is graft-modified with an unsaturated dicarboxylic anhydride compound and a carboxyl group is then incorporated into the grafted unsaturated compound through a chemical reaction. For example, a polyolefin resin is graft-modified with maleic anhydride and this modified resin is reacted with water or an alcohol, such as methanol, ethanol, propanol, or butanol, to incorporate a carboxyl group. Examples of the unsaturated dicarboxylic anhydride compound include maleic anhydride, iraconic anhydride, citraconic anhydride, tetrahydrophthalic anhydride, and mixtures thereof. As the alcohol, primary, secondary, and tertiary alkyl alcohols are preferably used.

The amount of these modifying agents incorporated into the modified polyolefin resin may be from 0.1 to 10% by weight, preferably from 1 to 5% by weight, based on the amount of the unmodified polyolefin resin used for modification. If the amount thereof is below 0.1% by weight, hydroxyl groups or carboxyl groups may not be incorporated in an amount necessary for improvement of coating affinity. As the incorporated amount of a modifying agent increases, the hydroxyl group or carboxyl group content in the modified polyolefin resin increases. However, if the amount thereof exceeds 10% by weight, properties other than the coating affinity of the modified polyolefin resin and appearance of the resulting molded product may be deteriorated.

In the resin component in this invention, the content of the modified polyolefin resin may be 100%, but it should be at least 1% by weight. The content thereof is preferably 5% by weight or higher, more preferably 10% by weight or higher. If the content thereof is below 1% by weight, coating affinity is insufficient.

Resin(s) other than the modified polyolefin resin may be contained in the resin component of the present invention. Examples include polyolefin resins that have not been graft-modified, i.e., unmodified polyolefin resins. Specifically, for example, use can be made of the same polyolefin resins as those enumerated above as examples usable for graft modification. In view of high heat resistance, crystalline polypropylene resins such as propylene homopolymer, ethylene-propylene block copolymers, and ethylene-propylene random copolymers, and mixtures thereof are preferably added. Of these, a resin containing at least either of an ethylene-propylene block copolymer and an ethylene-propylene random copolymer is especially preferred from the standpoint of attaining improved coating affinity.

The ethylene content in the ethylene-propylene random copolymer is preferably 20% by weight or lower. If the ethylene content exceeds 20% by weight, heat resistance is impaired. From the standpoint of a balance between heat resistance and flexural modulus, the ethylene content in the ethylene-propylene random copolymer is preferably from 3 to 15% by weight, more preferably from 5 to 10% by weight.

Examples of unmodified polyolefin resins other than those described above include low-density polyethylene, high-density polyethylene, linear low-density polyethylene, polybutene, and copolymers of ethylene and other copolymerizable monomers (e.g., vinyl acetate).

The copolymer rubber contained in the rubber component in the present invention has a flexural modulus of less than 1,000 kg/cm$^2$ and is exemplified with an ethylene-$\alpha$-olefin copolymer rubber, an isoprene-isobutylene copolymer rubber, and a styrene-based elastomer.

Examples of the ethylene-$\alpha$-olefin copolymer rubber include ethylene-propylene copolymer rubbers (hereinafter referred to as EPM), ethylene-butene copolymer rubbers (hereinafter referred to as EBM), ethylene-propylene-diene copolymer rubbers (hereinafter referred to as EPDM), and mixtures thereof.

In these copolymer rubbers, the ethylene content may be in the range of more than 20 % by weight to 85% by weight. From the standpoint of enabling the copolymers to show good rubbery properties, the ethylene content is preferably from 35 to 75% by weight, more preferably from 45 to 70% by weight.

Examples of the diene component in EPDM include 1,4pentadiene, 1,4-hexadiene, cyclohexadiene, dicyclopentadiene, and 5-ethylidene-2-norbornene.

The ethylene-$\alpha$-olefin copolymer rubber herein may also be contained in the form of a rubbery block portion constituting a part of propylene-based block copolymers. In the case, the amount of rubbery block portions is regarded as the amount of ethylene-$\alpha$-olefin copolymer rubber and it can be determined by the following method. Five grams of the polymer is dissolved in 500 ml of xylene at 135° C. with stirring. After 20 minutes, the solution is cooled to 25° C. with stirring and then allowed to stand for 30 minutes. The resulting precipitate is filtered off with a filter paper. The filtrate solution is evaporated in a nitrogen stream, and the residue is dried in a vacuum at 80° C. until its weight becomes constant. Thus, the content of a polymer soluble in room-temperature xylene is calculated in terms of wt % and taken as the amount of rubbery block portions.

The ethylene-$\alpha$-olefin copolymer rubber can be either non-crystalline or partially crystalline. However, partially crystalline rubbers are desirable from the standpoint of imparting mechanical strength to a thermoplastic resin composition. The crystallinity of these copolymer rubbers, which is determined by X-ray diffraction as described in *Journal of Polymer Science*, Part A-2, vol. 9, pp. 127–141 (1971), is usually in the range of from 0 to 25%, preferably from 2 to 20%, more preferably from 5 to 15%.

The MFR (measured at 230° C. under a load of 2.16 kg according to JIS K7210) of the ethylene-$\alpha$-olefin copolymer rubber is preferably from 0.001 to 100 g/10min. If the MFR thereof exceeds 100 g/10min, the mechanical strength of the molded product of the thermoplastic resin composition may be deteriorated. If it is below 0.001, the resin composition tends to have poor flowability.

Use of the ethylene-$\alpha$-olefin copolymer rubber having a broader molecular weight distribution results in better coating affinity. Specifically, the ratio of MFR value at 230° C. under 21.6 kg load to MFR value at 230° C. under 2.16 kg load (hereinafter referred to as HLMFR/MFR) is preferably 20/1 or larger, preferably 30/1 or larger, more preferably 40/1 or larger. A blend of two or more ethylene-$\alpha$-olefin copolymer rubbers having different average molecular weights may be used for an ethylene-α-olefin copolymer rubber having such a wide molecular weight distribution.

Examples of the isoprene-isobutylene copolymer rubber include substantially non-crystalline isoprene-isobutylene copolymer rubbers obtained by known methods. These isoprene-isobutylene copolymer rubbers have an isoprene content of generally from 0.5 to 10% by weight, preferably from 1 to 4% by weight. The isoprene-isobutylene copolymer rubber include those which have been partly substituted by or addition-bonded with chlorine, bromine, or the like in an amount of from 0.1 to 3.0% by weight based on the rubber.

The MFR (measured at 230° C. under a load of 2.16 kg according to JIS K7210) of the isoprene-isobutylene copolymer rubber is preferably from 0.001 to 100 g/10min. If the MFR thereof exceeds 100 g/10min, a molded product of the thermoplastic resin composition tends to have impaired mechanical strength. If it is below 0.001 g/10min, the resulting resin composition tends to have poor flowability.

Use of the isoprene-isobutylene copolymer rubber broader molecular weight distribution results in better coating affinity. Specifically, the ratio HLMFR/MFR is generally 20/1 or larger, preferably 30/1 or larger, more preferably 40/1 or larger. In this regard, a blend of two or more isoprene-isobutylene copolymer rubbers having different average molecular weights may be used.

Examples of the styrene-based elastomer include elastomeric, random or block copolymers of a styrene-type compound (e.g., styrene or α-methylstyrene) and a conjugated diene (e.g., 1,3-butadiene or isoprene), and hydrogenation products of these copolymers. Of these styrene-based elastomers, block copolymers of a styrene-type compound and a conjugated diene compound are preferred. Particularly preferred of such block copolymers are those represented by the following general formula:

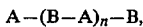
A—(B—A)$_n$—B,

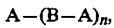
A—(B—A)$_n$, or

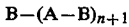
B—(A—B)$_{n+1}$ wherein A is a polymer block made up of a styrene-type compound, B is a conjugated diene polymer block, and n is an integer of 1 to 20, provided that the A block content in the molecule is from 1 to 50% by weight.

The weight average molecular weight of these copolymers may be from 10,000 to 1,000,000, preferably from 50,000 to 250,000.

Specific examples of the styrene-based elastomer include styrene-butadiene random copolymers, styrene-isoprene random copolymers, styrene-conjugated diene block copolymers such as styrene-butadiene-styrene triblock copolymers, styrene-isoprene-styrene triblock copolymers, styrene-butadiene radial block copolymers in which a polystyrene block constitutes each terminal segment, styrene-isoprene radial block copolymers in which a polystyrene block constitutes each terminal segment, styrene-butadiene multiblock copolymers, and styrene-isoprene block copolymers, and hydrogenation products of these copolymers.

Preferred of these styrene-based elastomers are hydrogenated styrene-conjugated diene block copolymers.

In the rubber component in this invention, the content of the copolymer rubber may be 100%, but it should be at least 20% by weight. The content thereof is preferably 40% by weight or higher, more preferably 60% by weight or higher. If the content thereof is below 20% by weight, a thermoplastic resin composition obtained using the rubber component tends to have impaired mechanical strength.

The rubber component in this invention may contain, besides the copolymer rubber described above, a rubber such as natural rubber or a synthetic rubber (e.g., polyisobutylene) and a softener such as process oil. The softener can be incorporated for the purposes of accelerating plasticization of the rubber component and improving flowability of the thermoplastic resin composition. This softener may be of any type selected from the paraffin, naphthene, and aromatic types.

The resin component and rubber component may further contain ingredients other than those described above, such as a resin or rubber other than those enumerated above, a filler, and additives, as long as the use of these optional ingredients does not depart from the spirit of the invention.

Examples of the filler include calcium carbonate, talc, silica, kaolin, clay, diatomaceous earth, calcium silicate, mica, asbestos, alumina, barium sulfate, aluminum sulfate, calcium sulfate, magnesium carbonate, carbon fibers, glass fibers, glass beads, molybdenum sulfide, graphite, and shirasu balloons. Examples of additives include a heat stabilizer, weathering stabilizer, colorant, antistatic agent, flame retardant, nucleating agent, lubricant, slip agent, anti-blocking agent, and the like. As the heat stabilizer, there may be used conventional heat stabilizers of the phenolic, phosphorus, and sulfur types and the like. As the weathering stabilizer, there may be used such as those of the hindered amine and triazole types and the like. Examples of the colorant include carbon black, titanium white, zinc white, red iron oxide, azo compounds, nitroso compounds, and phthalocyanine compounds. The antistatic agent, flame retardant, nucleating agent, lubricant, slip agent, anti-blocking agent, and the like each may be conventional ones.

The functional group-terminated oligomer in the present invention is an oligomer which is in the form of a liquid rubber or a waxy solid and has a functional group at least one end of each molecule thereof.

Examples of the functional group include hydroxyl group, amino group, carboxyl group, epoxy group, and thiol group. The oligomer may contain two or more of these groups as long as the functional groups selected do not react with each other. Of these, hydroxyl group or amino group is preferred as the functional group to be contained in the oligomer, from the standpoint of affinity for urethane coatings.

The number-average molecular weight of the functional group-terminated oligomer is from 300 to 10,000, preferably from 500 to 8,000, more preferably from 500 to 6,000. If the number-average molecular weight thereof exceeds 10,000, incorporation of such an oligomer is ineffective in improving coating affinity.

Among functional group-terminated oligomers of the above-described kind, those having an unsaturated bond within the molecule thereof are commercially available at low cost. The iodine values of such oligomers (the number of grams of iodine that adds 100 g of oligomer)

are preferably 0 to 50, more preferably 0 to 30, most preferably 0 to 10. Molded products of the thermoplastic resin composition having a smaller iodine values exhibit better urethane coating adhesion strength especially when peeled as rapidly as 1,000 mm/min.

These functional group-terminated oligomers may be used alone or as a mixture of two or more thereof.

Specific examples of the functional group-terminated oligomer in this invention include polybutadiene (the polymerization mode may be either 1,2- or 1,4-addition; in the latter case, the configuration involving double bonds may be either cis or trans), polyisoprene, isobutylene-isoprene copolymers (butyl rubber), polybutene, butadiene-acrylonitrile copolymers, styrene-butadiene copolymers (which may be either block or random), petroleum resins, and products of the partial or complete hydrogenation of these, provided that these polymers are oligomers containing a functional group at least one end of each molecule thereof and having a number-average molecular weight of 10,000 or below. These oligomers may be copolymerized with a polymerizable monomer in such an amount that the performances of the resin composition of the present invention is not impaired. The resulting oligomers may have a cyclic structure. Examples of the polymerizable monomer include 1,3-butadiene, 1,3-pentadiene, isoprene, chloroprene, 2,3-dimethyl-1,3-butadiene, 1-phenyl-1,3-butadiene, piperylene, 2-methylbutene-1, 2-methylbutene-2, styrene, vinyltoluene, α-methylstyrene, and indene. These copolymers may have been partly or completely hydrogenated.

These functional group-terminated oligomers can be produced by known methods. Commercially available products of these oligomers include: hydroxyl group-terminated hydrogenated 1,4-polybutadiene (trade name "Polytail-H" and "Polytail-HA" manufactured by Mitsubishi Kasei Corporation, Japan); hydroxyl group-terminated hydrogenated polyolefin (trade name "Epol", manufactured by Idemitsu Petrochemical Co., Ltd., Japan ); hydroxyl group-terminated 1,2polybutadiene (trade name "NISSO-PB G-1000", manufactured by Nippon Soda Co., Ltd., Japan); hydroxyl group-terminated hydrogenated 1,2-polybutadiene ( trade name "NISSO-PB GI-1000", manufactured by Nippon Soda Co., Ltd., Japan); and amino group-terminated acrylonitrile-butadiene rubber (trade name "Hycar-ATBN", manufactured by Ube Industries, Ltd., Japan). These are easily available and can be advantageously used in this invention.

The thermoplastic resin composition of the present invention comprises a resin component containing at least a modified polyolefin resin which has been graft-modified with an unsaturated hydroxy group-containing compound or an unsaturated carboxylic acid, a rubber component containing at least a copolymer rubber, and a functional group-terminated oligomer. In such thermoplastic resin composition of this invention, the amount of the functional group-terminated oligomer incorporated therein per 100 parts by weight of the sum of the resin component and the rubber component is 0.1 to 20 parts by weight, preferably 0.5 to 10 parts by weight, more preferably 1 to 5 parts by weight. If the amount of the oligomer is less than 0.1 part by weight, the incorporation thereof is ineffective in improving coating affinity. If the amount exceeds 20 parts by weight, bleeding of the oligomer to the surface of molded products becomes severe to impair the appearance and surface feeling of the molded products.

In general, use of a functional group-terminated oligomer in the form of a waxy crystalline solid is preferred because this oligomer is less apt to impair surface feeling even when used in a large quantity. The waxy crystalline solid preferably has a melting point of 40° to 100° C. when measured by differential scanning calorimetry (DSC).

The amount of the rubber component (b) is 20 to 80 parts by weight, preferably 30 to 70 parts by weight, more preferably 40 to 60 parts by weight, per 100 parts by weight of the sum of the resin component (a) and the rubber component (b). If the amount of the rubber component is below 20 parts by weight, sufficient coating affinity cannot be obtained. If the amount thereof exceeds 80 parts by weight, heat resistance becomes insufficient.

It is desirable from the standpoint of coating affinity that the resin component (a) and the rubber component (b) be blended in such a proportion that the amount of hydroxyl groups or carboxyl groups contained in the resin component is 0.01% by weight or more, preferably 0.1% by weight or more, in terms of the amount of hydroxyethyl methacrylate or acrylic acid, respectively, based on the sum of the components (a) and (b), which can be calculated by the following equations (1) and (2).

Amount of hydroxyl group (wt %)$= 130 \times A \times Y/M$    (1)

Amount of carboxyl group (wt %)$= 72 \times A' \times Y/M$    (2)

In equations (1 ) and (2 ), A and A' are the numbers of hydroxyl group and carboxyl group, respectively, contained in one molecule of the modifying agent; Y is an amount (wt %) of the modifying agent based on the sum of the components (a) and (b); and M is a molecular weight of the modifying agent.

It is preferred in the present invention that a compound which accelerates reaction between a hydroxyl group or a carboxyl group and an isocyanate group (hereinafter referred to as "accelerator") be incorporated in a small amount for the purpose of accelerating the reaction of the hydroxyl or carboxyl groups in the thermoplastic resin composition with a urethane coating thereby to enhance coating film adhesion strength. Examples of the accelerator include an organotin compounds, tertiary amine compounds, lead compounds, titanium compounds, cobalt compounds, aluminum compounds, zinc compounds, iron compounds, alkali metal salts of carboxylic acids, bismuth compounds, or the like.

Examples of the organotin compound include mono- or di- or trialkyltin carboxylates or alkoxides, such as dibutyltin dilaurate, dibutyltin distearate, dibutyltin maleate, dibutyltin dioctylmaleate, dibutyltin diacetate, dibutyltin 2-ethylhexanoate, tributyltin acetate, and dibutyltin dibutoxide, and tetraalkyldistannoxane compounds such as tetrabutyl-1,3-diacetoxydistannoxane. The alkyl groups herein mean straight-chain or branched hydrocarbon groups having from 1 to 30 carbon atoms, which may contain an unsaturated bond. Other useful organotin compounds are dibutyltin bis(acetylacetonate), di-2-ethylhexyltin oxide, and the like.

Examples of the tertiary amine include tetraalkylethylenediamines, N,N-dialkylbenzylamines, N,N-dialkylanilines, N,N-dialkylethanolamines, 1,4-diazabicyclo[2.2.2]octane, 1,8-diazabicyclo[5.4.0]-7-undecene, and N,N-dialkylaminopyridines. The alkyl groups herein mean straight-chain or branched hydrocarbon groups having from 1 to 30 carbon atoms, which may contain an unsaturated bond.

Examples of the lead compound include lead benzoate, lead octylate, lead stearate, and lead oleate. Examples of the titanium compound include tetra(2-ethylhexyl) titanate, tetrabutyl titanate, and tetrapropyl titanate. Examples of the cobalt compound include cobalt naphthenate, cobalt octylate, cobalt benzoate, cobalt oleate, and cobalt stearate. Examples of the aluminum compound include aluminum acetate, aluminum oleate, aluminum propoxide, aluminum butoxide, and aluminum stearate. Examples of the zinc compound include zinc naphthenate, zinc octylate, zinc oleate, and zinc stearate. Examples of the iron compound include iron octylate, iron oleate, iron stearate, iron acetylacetonate, and iron chloride. Examples of the alkali metal salt of carboxylic acid include lithium, sodium, potassium, rubidium, or cesium salts of carboxylic acids such as acetic acid, propionic acid, oleic acid, stearic acid, and benzoic acid. Examples of the bismuth compound include bismuth nitrate and bismuth acetate. Besides the above-enumerated compounds, examples of the accelerator further include those described in *J. Appl. Polym. Sci.*, Vol.4, No. 11, pp. 207–211 (1960). These compounds may also be used as a mixture of two or more thereof.

The accelerator may be incorporated generally in an amount of from 0.005 to 10 parts by weight, preferably from 0.02 to 5 parts by weight, more preferably from 0.05 to 3 parts by weight, per 100 parts by weight of the sum of the resin component (a) and the rubber component (b). If the amount of the accelerator incorporated is below 0.005 part by weight, the effect of the accelerator is insufficient. Amounts thereof exceeding 10 parts by weight are disadvantageous because the effect of accelerator incorporation cannot be enhanced and adverse effects such as bleeding may occur.

The thermoplastic resin composition of the present invention can be prepared by mixing beforehand a resin component containing the above-described modified polyolefin resin with a copolymer rubber-containing rubber component and a functional group-terminated oligomer (if required, further with an accelerator of any of the above-described kinds) by means of a Henschel mixer or the like, and then kneading the mixture with heating using a mixing machine such as an ordinary twin-screw extruder, single-screw extruder, or Banbury mixer.

The kneading temperature is desirably not lower than the softening point of the polyolefin resin used. It is generally between 100° and 300° C. The thermoplastic resin composition of this invention can also be prepared by a method in which a polyolefin resin is graft-modified using an extruder, and after completion of the graft reaction, a copolymer rubber and a functional group-terminated oligomer are subsequently fed to the extruder from a side feed disposed in the middle part of the extruder.

The thus-obtained thermoplastic resin composition can be molded by an ordinary molding technique such as extrusion, injection molding, press molding, or the like. By coating these molded products for coloring or surface protection, coated products are obtained. The coating material used here may be acrylic or urethane or of other types, preferably urethane, and the urethane type coating material may be of either the two-pack type or the one-pack type. Besides urethane coatings, any coating material having affinity for such functional groups as hydroxyl group and amino group can be used.

For applying such a coating material, ordinarily employed techniques can be used. For example, use may be made of coating with a spray gun, coating with a brush, or coating with a roll coater.

The thickness of coating film can be varied depending on intended use of the molded product, and is not particularly limited. However, it is usually in the range of from 1 μm to 500 μm on a dry basis.

The coated product obtained using the thermoplastic resin composition of this invention has good appearance and excellent surface physical properties. Although abrasion resistance, scratch resistance, and similar properties of uncoated molded products obtained using the thermoplastic resin composition of this invention are not always sufficient because the products are composed mainly of a polyolefin resin, the appearance and surface physical properties of the products are greatly improved by coating.

The thus-produced coated products can be utilized as various kinds of industrial parts such as, for example, exterior automotive parts including bumpers, corner bumpers, bumper air dam skirts, mudguards, side moldings, wheel caps, spoilers, side steps, and door mirror bases, interior automotive parts including instrument panels, levers, knobs, dashboards, and door liners, electric appliances including connectors, cap plugs, electric vacuum bottles, refrigerators, lighting apparatus, audio devices, and OA machines and devices, and miscellaneous daily necessaries including cupboards and chests.

The present invention will be explained below in more detail with reference to the following examples, but the invention is not construed as being limited thereto. In these examples, the following measuring methods, resins, and other materials were used.

MFR:
JIS K7210 (load 2.16 kg, 230° C.)

HLMFR:
JIS K7210 (load 21.6 kg, 230° C.)

Modified Polyolefin Resins

PP1:
2-Hydroxyetyl methacrylate (hereinafter abbreviated as "HEMA")-modified propylene homopolymer (as obtained in Synthesis Example 1 given later)

PP2:
HEMA-modified ethylene-propylene random copolymer (as obtained in Synthesis Example 2 given later)

PP3:
Hydroxyl group-containing propylene oligomer ("MPX1201"; manufactured by Sanyo Chemical Industries, Ltd. Japan; number-average molecular weight, 4,000; hydroxyl number, 15 mgKOH/g; 3.6 wt % in terms of HEMA content)

PP4:
HEMA-modified propylene homopolymer (MFR, 20.0 g/10rain; HEMA, 1.6 wt %)

PP5:
HEMA-modified ethylene-propylene random copolymer (MFR, 100 g/10min; ethylene content, 7 wt %; HEMA, 1.6 wt %)

PP6:
Hydroxyl group-containing propylene oligomer ("MPX120H"; manufactured by Sanyo Chemical Industries, Ltd.; number-average molecular weight, 15,000; hydroxyl number, 15 mgKOH/g; 3.6 wt % in terms of HEMA content)

PP7:
Acrylic acid-modified propylene homopolymer (MFR, 20.0 g/10min; acrylic acid, 6 wt %)

PP8:
Acrylic acid-modified ethylene-propylene random copolymer (MFR, 100 g/10min; ethylene content, 7 wt %, acrylic acid, 6 wt %)

Copolymer Rubbers

EPM1:
Ethylene-propylene rubber (MFR, 1.0 g/10 min; HLMFR/MFR=43; ethylene content, 62 wt %)

EPM2:
Ethylene-propylene rubber (MFR, 0.01 g/10min; HLMFR/MFR=53; ethylene content 62 wt %)

EPM3:
Oil-extended ethylene-propylene rubber (extending oil amount, 10%; MFR, 2.0 g/10min; HLMFR/MFR=45; ethylene content, 62 wt %)

IIR:
Isoprene-isobutylene copolymer rubber ("JSR Butyl 365"; manufactured by Japan Synthetic Rubber Co., Ltd.; MFR, 1.0 g/10min; HLMFR/MFR=90)

SEBS:
Hydrogenated styrene-butadiene-styrene triblock copolymer (styrene content, 29 wt %; MFR, 2.0 g/10min)

SEPS1:
Hydrogenated styrene-isoprene-styrene triblock copolymer (styrene content, 30 wt %; MFR, 30 g/10min)

SEPS2:
Hydrogenated styrene-isoprene-styrene triblock copolymer (styrene content, 13 wt %; MFR 2.7 g/10min)

Functional Group-Terminated Oligomers

HTBR1:
Both end-hydroxylated, liquid 1,2-polybutadiene (1,2-bond, 92%; number-average molecular weight, 1,350; iodine value, 400; average hydroxyl group number, 1.6 per molecule)

HTBR 2:
Both end-hydroxylated, liquid 1,2-polybutadiene (1,2-bond, 92%; number-average molecular weight, 3,000; iodine value, 400; average hydroxyl group number, 1.6 per molecule)

HTBR3:
Both end-hydroxylated, liquid 1,4-polybutadiene (1,4-bond, 80%; number-average molecular weight, 1,200; iodine value, 400; hydroxyl number, 46.6 mgKOH/g)

HTBR 4:
Both end-hydroxylated, hydrogenated, liquid 1,2-polybutadiene (1,2-bond, 92%; number-average molecular weight, 1,400; iodine value, 10.3; average hydroxyl group number, 1.6 per molecule)

HTBR5:
Both end-hydroxylated, hydrogenated, waxy 1,4-polybutadiene (1,4-bond, 80%; number-average molecular weight, 2,800; iodine value, 1.5; average hydroxyl group number, 2.3 per molecule; melting point, 72.5° C. (measured at the heating rate of 10° C./min by DSC7 manufactured by PERKIN-ELMER CO.))

HTBR 6:
Both end-hydroxylated, hydrogenated, liquid 1,4-polybutadiene (1,4-bond, 80%; number-average molecular weight, 2,200; iodine value, 1.5; average hydroxyl group number, 2.3 per molecule)

HTBR 7:
Both end-hydroxylated, hydrogenated, liquid polyolefin (number-average molecular weight, 2,500; iodine value, 8; average hydroxyl group number, 2.3 per molecule)

HTBR8:
Both end-hydroxylated, hydrogenated, liquid 1,2-polybutadiene (1,2-bond, 92%; number-average molecular weight, 3,000; iodine value, 10.3; average hydroxyl group number, 1.6 per molecule)

ATBN:
Both end-aminated butadiene-nitrile rubber (acrylonitrile content, 16.5%; number-average molecular weight, 4,000; iodine value, 330; amine equivalent, 900)

Synthesis Example 1 (Syntheses of PP1)

| | |
|---|---|
| Propylene homopolymer (MFR, 0.5 g/10 min) | 100 parts by weight |
| HEMA | 4 parts by weight |
| 2,5-Bis(t-butylperoxy)-2,5-dimethylhexane (hereinafter abbreviated as "PO") | 1 part by weight |

A mixture of the above ingredients was kneaded at 180° C. by means of a twin-screw extruder to conduct graft modification. The modified polyolefin resin thus obtained had a grafted HEMA amount of 1.5 wt % and an MFR of 130 g/10 min.

Synthesis Example 2 (Synthesis of PP2)

| | |
|---|---|
| Ethylene-propylene random copolymer (MFR, 0.1 g/10 min; ethylene content, 7 wt %) | 100 parts by weight |
| HEMA | 4 parts by weight |
| PO | 1 part by weight |

A mixture of the above ingredients was kneaded at 180° C. by means of a twin-screw extruder to conduct graft modification. The modified polyolefin resin thus obtained had a grafted HEMA amount of 1.5 wt % and an MFR of 130 g/10 min.

EXAMPLES 1 TO 29 AND COMPARATIVE EXAMPLES 1 TO 3

Preparation of Thermoplastic Resin Composition

According to the formulations (parts by weight) shown in Table 1, the above-described modified polyolefin resins were mixed with ethylene-α-olefin copolymer rubbers, functional group-terminated oligomers, and compounds accelerating a reaction with an isocyanate group (accelerators). The mixtures each was kneaded at 180° C. using a twin-screw extruder to obtain thermoplastic resin compositions. The thus-obtained thermoplastic resin compositions were coated as follows.

Evaluation of Coating affinity

A two-pack urethane coating (R-278, manufactured by Nippon Bee Chemical Co., Ltd., Japan) was used. As samples, 2 mm-thick injection-molded flat plates of the thermoplastic resin compositions were used. The surface of each flat plate was wiped with isopropyl alcohol and the coating was then applied thereon at a coating film thickness of about 100 μm. The coated plates were subjected to a peel test in which the coating film was cut into a width of 10 mm and 180-degree peeling was conducted at the peel angle of 180° and the peel rates of 50 mm/min and 1,000 mm/min. The coating adhesion strengths of the coated products are shown in Table 1.

TABLE 1

| Example | Modified Polyolefin | | | | | | Copolymer Rubber | | | Functional Group-Terminated Oligomer | | Accelerator | | OH content (wt %) | Coating Adhesion Strength (g/10 mm width) | |
| | PP1 | PP2 | PP3 | PP6 | PP*1 | | EPM1 | EPM2 | EPM3 | Kind | Amount | Kind | Amount | | 50 mm/min | 1000 mm/min |
|---|---|---|---|---|---|---|---|---|---|---|---|---|---|---|---|---|
| Ex. 1 | 50 | — | — | — | — | | 50 | — | — | HTBR1 | 3 | organotin*2 compound 1 | 0.4 | 0.75 | 1050 | 350 |
| Ex. 2 | — | 40 | — | — | — | | 60 | — | — | " | 3 | organotin*2 compound 1 | 0.4 | 0.60 | 1100 | 400 |
| Ex. 3 | — | 50 | — | — | — | | 50 | — | — | " | 3 | organotin*2 compound 1 | 0.4 | 0.75 | 1200 | 500 |
| Ex. 4 | — | 60 | — | — | — | | 40 | — | — | " | 3 | organotin*2 compound 1 | 0.4 | 0.90 | 950 | 300 |
| Ex. 5 | 30 | 20 | — | — | — | | 50 | — | — | " | 3 | organotin*2 compound 1 | 0.4 | 0.75 | 1200 | 600 |
| Ex. 6 | 30 | 20 | — | — | — | | 50 | — | — | ATBN | 3 | organotin*2 compound 1 | 0.4 | 0.75 | 1000 | 400 |
| Ex. 7 | 30 | 20 | — | — | — | | 40 | 10 | — | HTBR1 | 1 | organotin*2 compound 1 | 0.4 | 0.75 | 900 | 350 |
| Ex. 8 | 30 | 20 | — | — | — | | 40 | 10 | — | " | 5 | organotin*2 compound 1 | 0.4 | 0.75 | 1500 | 750 |
| Ex. 9 | 30 | 20 | — | — | — | | 40 | 10 | — | " | 3 | organotin*2 compound 1 | 0.4 | 0.75 | 1000 | 600 |
| Ex. 10 | 30 | 20 | — | — | — | | 40 | 10 | — | HTBR2 | 3 | organotin*2 compound 1 | 0.4 | 0.75 | 1250 | 450 |
| Ex. 11 | 30 | 20 | — | — | — | | 40 | 10 | — | HTBR3 | 3 | organotin*2 compound 1 | 0.4 | 0.75 | 1150 | 500 |
| Ex. 12 | 30 | 20 | — | — | 40 | | 40 | 10 | — | ATBN | 3 | organotin*2 compound 1 | 0.4 | 0.75 | 1100 | 400 |
| Ex. 13 | 10 | — | 10 | — | 40 | | 40 | 10 | — | HTBR1 | 3 | organotin*2 compound 1 | 0.4 | 0.15 | 1050 | 450 |
| Ex. 14 | — | — | — | — | — | | 40 | 10 | — | " | 3 | organotin*2 compound 1 | 0.4 | 0.36 | 1200 | 650 |
| Ex. 15 | 30 | 20 | — | — | — | | 40 | 10 | — | " | 3 | organotin*2 compound 1 | 0.4 | 0.75 | 1350 | 500 |
| Ex. 16 | 30 | 20 | — | — | — | | 40 | 10 | — | ATBN | 3 | tertiary*4 amine | 0.4 | 0.75 | 950 | 400 |
| Ex. 17 | 30 | 20 | — | — | — | | — | — | 50 | HTBR1 | 3 | tertiary amine | 0.4 | 0.75 | 1050 | 350 |
| Ex. 18 | 30 | 20 | — | — | — | | 40 | 10 | — | HTBR4 | 3 | organotin compound 1 | 0.4 | 0.75 | 1500 | 1900 |
| Ex. 19 | 30 | 20 | — | — | — | | 40 | 10 | — | HTBR5 | 3 | organotin compound 1 | 0.4 | 0.75 | 1450 | 2400 |
| Ex. 20 | 30 | 20 | — | — | — | | 40 | 10 | — | HTBR6 | 3 | organotin compound 1 | 0.4 | 0.75 | 1100 | 1300 |
| Ex. 21 | 30 | 20 | — | — | — | | 40 | 10 | — | HTBR7 | 3 | organotin compound 1 | 0.4 | 0.75 | 1300 | 1500 |
| Ex. 22 | 30 | 20 | — | — | — | | 40 | 10 | — | HTBR8 | 3 | organotin compound 1 | 0.4 | 0.75 | 1200 | 1500 |
| Ex. 23 | 30 | 20 | — | — | — | | 40 | 10 | — | HTBR1 | 3 | — | — | 0.75 | 900 | 350 |
| Ex. 24 | 30 | — | — | — | — | | 70 | — | — | HTBR5 | 3 | organotin*3 compound 2 | 0.4 | 0.45 | 1050 | 1600 |
| Ex. 25 | 30 | 20 | — | — | — | | 50 | — | — | " | 3 | organotin*3 compound 2 | 0.4 | 0.75 | 1200 | 2100 |

TABLE 1-continued

| Example | Modified Polyolefin | | | | | Copolymer Rubber | | | Functional Group-Terminated Oligomer | | Accelerator | | OH content (wt %) | Coating Adhesion Strength (g/10 mm width) | |
|---|---|---|---|---|---|---|---|---|---|---|---|---|---|---|---|
| | PP1 | PP2 | PP3 | PP6 | PP*1 | EPM1 | EPM2 | EPM3 | Kind | Amount | Kind | Amount | | 50 mm/min | 1000 mm/min |
| Ex. 26 | 30 | 20 | — | — | 20 | 30 | — | — | " | 3 | compound 2 organotin*3 | 0.4 | 0.75 | 1300 | 1850 |
| Ex. 27 | — | — | — | 10 | 60 | 30 | — | — | " | 3 | compound 2 organotin*3 | 0.4 | 0.36 | 1000 | 1550 |
| Ex. 28 | — | — | — | 10 | 40 | 50 | — | — | " | 3 | compound 2 organotin*3 | 0.4 | 0.36 | 1050 | 1700 |
| Ex. 29 | — | — | — | 10 | 20 | 70 | — | — | " | 3 | compound 2 organotin*3 | 0.4 | 0.36 | 1100 | 1650 |
| Comp. Ex. 1 | 30 | 20 | — | — | — | 40 | 10 | — | — | — | compound 2 organotin | 0.4 | 0.75 | 350 | 400 |
| Comp. Ex. 2 | — | — | — | — | 50 | 40 | 10 | — | HTBR1 | 3 | compound 1 organotin | 0.4 | 0 | 150 | 150 |
| Comp. Ex. 3 | — | — | — | — | 50 | 40 | 10 | — | — | — | compound 1 | 0.4 | 0 | 50 | 100 |

Note:
*1unmodified ethylene-propylene random copolymer (ethylene content 6.5 wt %, MFR 25.0 g/10 min.)
*2dibutyltin maleate ("STANN BM(N)", manufactured by Sankyo Yuki Gosei K.K.)
*3dibutyltin distearate
*41,4-diazabicyclo[2.2.2]octane

EXAMPLES 30 TO 59 AND COMPARATIVE EXAMPLES 4 TO 6

Thermoplastic resin compositions were obtained in the same manner as in Example 1 except that the modified polyolefin resin and accelerator used in Example 1 were changed as shown in Table 2. The thus-obtained thermoplastic resin compositions were coated and evaluated for coating adhesion strength, in the same manner as in Example 1. The results obtained are shown in Table 2.

EXAMPLES 60 TO 84 AND COMPARATIVE EXAMPLES 7 TO 9

Thermoplastic resin compositions were obtained in the same manner as in Example 1 except that the modified polyolefin resin used in Example 1 was changed as shown in Table 3. The thus-obtained thermoplastic resin compositions were coated and evaluated for coating adhesion strength, in the same manner as in Example 1. The results obtained are shown in Table 3.

TABLE 2

| Example | Modified Polyolefin PP4 | PP5 | PP6 | PP*1 | Copolymer Rubber EPM1 | EPM2 | Functional Group-Terminated Oligomer Kind | Amount | Accelerator Kind | Amount (phr) | OH content (wt %) | Coating Adhesion Strength (g/10 mm width) 50 mm/min | 1000 mm/min |
|---|---|---|---|---|---|---|---|---|---|---|---|---|---|
| Ex. 30 | 30 | 20 | — | — | 40 | 10 | HTBR1 | 3 | lead octylate | 0.4 | 0.75 | 1250 | 450 |
| Ex. 31 | 30 | 20 | — | — | 40 | 10 | HTBR2 | 3 | " | 0.4 | 0.75 | 1050 | 550 |
| Ex. 32 | 30 | 20 | — | — | 40 | 10 | HTBR3 | 3 | " | 0.4 | 0.75 | 1150 | 500 |
| Ex. 33 | 30 | 20 | — | — | 40 | 10 | HTBR4 | 3 | " | 0.4 | 0.75 | 1500 | 1900 |
| Ex. 34 | 30 | 20 | — | — | 40 | 10 | HTBR5 | 3 | " | 0.4 | 0.75 | 1450 | 2400 |
| Ex. 35 | 50 | — | — | — | 50 | — | " | 3 | " | 0.4 | 0.75 | 1050 | 1350 |
| Ex. 36 | — | 40 | — | — | 60 | — | " | 3 | " | 0.4 | 0.60 | 1100 | 1500 |
| Ex. 37 | — | 50 | — | — | 50 | — | " | 3 | " | 0.4 | 0.75 | 1200 | 1450 |
| Ex. 38 | — | 60 | — | — | 40 | — | " | 3 | " | 0.4 | 0.90 | 950 | 1200 |
| Ex. 39 | 30 | 20 | — | — | 50 | — | " | 3 | " | 0.4 | 0.75 | 1200 | 1550 |
| Ex. 40 | 20 | 20 | — | 10 | 50 | — | " | 3 | " | 0.4 | 0.60 | 1100 | 1350 |
| Ex. 41 | 30 | 20 | — | — | 40 | 10 | " | 3 | " | 0.4 | 0.75 | 900 | 1100 |
| Ex. 42 | 30 | 20 | — | — | 40 | 10 | " | 3 | tetrabutyl titanate | 0.4 | 0.75 | 1500 | 1800 |
| Ex. 43 | 30 | 20 | — | — | 50 | — | " | 3 | tetrabutyl titanate | 0.4 | 0.75 | 950 | 1250 |
| Ex. 44 | 30 | 20 | — | — | 40 | 10 | HTBR5 | 3 | cobalt naphthenate | 0.4 | 0.75 | 1000 | 1250 |
| Ex. 45 | 30 | 20 | — | — | 50 | — | " | 3 | cobalt naphthenate | 0.4 | 0.75 | 950 | 1250 |
| Ex. 46 | 20 | 20 | — | 10 | 50 | — | " | 3 | aluminium propoxide | 0.4 | 0.75 | 1050 | 1350 |
| Ex. 47 | 30 | 20 | — | — | 50 | — | " | 3 | aluminium propoxide | 0.4 | 0.75 | 1200 | 1500 |
| Ex. 48 | 20 | 20 | — | 10 | 50 | — | " | 3 | zinc stearate | 0.4 | 0.75 | 1100 | 1400 |
| Ex. 49 | 30 | 20 | — | — | 50 | — | " | 3 | " | 0.4 | 0.75 | 950 | 1200 |
| Ex. 50 | 20 | 20 | — | 10 | 50 | — | " | 3 | iron acetylacetonate | 0.4 | 0.75 | 1050 | 1350 |
| Ex. 51 | 30 | 20 | — | — | 50 | — | " | 3 | iron acetylacetonate | 0.4 | 0.75 | 1000 | 1250 |
| Ex. 52 | 20 | 20 | — | 10 | 50 | — | " | 3 | potassium oleate | 0.4 | 0.75 | 1050 | 1300 |
| Ex. 53 | 30 | 20 | — | — | 50 | — | " | 3 | potassium oleate | 0.4 | 0.75 | 950 | 1250 |
| Ex. 54 | 10 | — | — | 40 | 40 | 10 | " | 3 | lead octylate | 0.4 | 0.15 | 1050 | 1300 |
| Ex. 55 | — | — | 10 | 40 | 40 | 10 | " | 3 | " | 0.4 | 0.36 | 1200 | 1500 |
| Ex. 56 | 30 | 20 | — | — | 40 | 10 | HTBR6 | 3 | " | 0.4 | 0.75 | 1100 | 1300 |
| Ex. 57 | 30 | 20 | — | — | 40 | 10 | HTBR7 | 3 | lead octylate | 0.4 | 0.75 | 1300 | 1550 |
| Ex. 58 | 30 | 20 | — | — | 40 | 10 | HTBR8 | 3 | " | 0.4 | 0.75 | 1200 | 1500 |
| Ex. 59 | 30 | 20 | — | — | 40 | 10 | ATBM | 3 | " | 0.4 | 0.75 | 950 | 400 |
| Comp. Ex. 4 | 30 | 20 | — | — | 40 | 10 | — | — | " | 0.4 | 0.75 | 350 | 400 |
| Comp. Ex. 5 | — | — | — | 50 | 40 | 10 | HTBR1 | 3 | " | — | 0 | 500 | 450 |
| Comp. Ex. 6 | — | — | — | 50 | 40 | 10 | — | — | " | — | 0 | 50 | 100 |

*1 see Table 1

TABLE 3

| Example | Modified Polyolefin PP7 | PP8 | PP*1 | Copolymer Rubber EPM1 | EPM2 | Functional Group-Terminated Oligomer Kind | Amount | Accelerator Kind | Amount | COOH content (wt %) | Coating Adhesion Strength (g/10 mm width) 50 mm/min | 1000 mm/min |
|---|---|---|---|---|---|---|---|---|---|---|---|---|
| Ex. 60 | 50 | — | — | 50 | — | HTBR1 | 3 | organotin compound*2 | 0.4 | 3.00 | 1000 | 350 |
| Ex. 61 | 30 | 20 | — | 50 | — | " | 3 | " | 0.4 | 3.00 | 1100 | 600 |
| Ex. 62 | 30 | 20 | — | 50 | — | ATBN | 3 | " | 0.4 | 3.00 | 950 | 400 |
| Ex. 63 | 30 | 20 | — | 40 | 10 | HTBR1 | 1 | " | 0.4 | 3.00 | 900 | 350 |
| Ex. 64 | 30 | 20 | — | 40 | 10 | " | 3 | " | 0.4 | 3.00 | 1100 | 750 |
| Ex. 65 | 30 | 20 | — | 40 | 10 | " | 5 | " | 0.4 | 3.00 | 1000 | 600 |
| Ex. 66 | 30 | 20 | — | 40 | 10 | HTBR2 | 3 | " | 0.4 | 3.00 | 1050 | 450 |
| Ex. 67 | 30 | 20 | — | 40 | 10 | HTBR3 | 3 | " | 0.4 | 3.00 | 1150 | 500 |
| Ex. 68 | 30 | 20 | — | 40 | 10 | ATBN | 3 | " | 0.4 | 3.00 | 1100 | 400 |

TABLE 3-continued

| Example | Modified Polyolefin PP7 | PP8 | PP*1 | Copolymer Rubber EPM1 | EPM2 | Functional Group-Terminated Oligomer Kind | Amount | Accelerator Kind | Amount | COOH content (wt %) | Coating Adhesion Strength (g/10 mm width) 50 mm/min | 1000 mm/min |
|---|---|---|---|---|---|---|---|---|---|---|---|---|
| Ex. 69 | 30 | 20 | — | 40 | 10 | HTBR4 | 3 | " | 0.4 | 3.00 | 1200 | 1900 |
| Ex. 70 | — | 40 | — | 60 | — | HTBR5 | 3 | " | 0.4 | 2.40 | 1000 | 1400 |
| Ex. 71 | — | 50 | — | 50 | — | " | 3 | " | 0.4 | 3.00 | 1050 | 1500 |
| Ex. 72 | — | 60 | — | 40 | — | " | 3 | " | 0.4 | 3.60 | 950 | 1300 |
| Ex. 73 | 25 | — | 25 | 50 | — | " | 3 | " | 0.4 | 1.50 | 950 | 1200 |
| Ex. 74 | 10 | — | 40 | 50 | — | " | 3 | " | 0.4 | 0.60 | 800 | 1100 |
| Ex. 75 | 30 | 20 | — | 40 | 10 | HTBR5 | 3 | organotin compound 1 | 0.4 | 3.00 | 1250 | 1600 |
| Ex. 76 | 30 | 20 | — | 40 | 10 | HTBR6 | 3 | " | 0.4 | 3.00 | 1100 | 1300 |
| Ex. 77 | 30 | 20 | — | 40 | 10 | HTBR7 | 3 | " | 0.4 | 3.00 | 1150 | 1500 |
| Ex. 78 | 30 | 20 | — | 40 | 10 | HTBR8 | 3 | " | 0.4 | 3.00 | 1200 | 1500 |
| Ex. 79 | 30 | 20 | — | 40 | 10 | HTBR1 | 3 | tertiary amine*4 | 0.4 | 3.00 | 1050 | 500 |
| Ex. 80 | 30 | 20 | — | 40 | 10 | ATBN | 3 | " | 0.4 | 3.00 | 950 | 400 |
| Ex. 81 | 30 | 20 | — | 40 | 10 | HTBR5 | 3 | — | — | 3.00 | 900 | 1100 |
| Ex. 82 | 30 | — | — | 70 | — | " | 3 | organotin compound 2*3 | 0.4 | 1.80 | 1100 | 1700 |
| Ex. 83 | 30 | 20 | — | 50 | — | " | 3 | " | 0.4 | 3.00 | 1200 | 1650 |
| Ex. 84 | 30 | 20 | 20 | 30 | — | " | 3 | " | 0.4 | 3.00 | 1250 | 1700 |
| Comp. Ex. 7 | 30 | 20 | — | 40 | 10 | — | — | organotin compound 1 | 0.4 | 3.00 | 350 | 400 |
| Comp. Ex. 8 | — | — | 50 | 40 | 10 | HRBR1 | 3 | " | 0.4 | 0.00 | 150 | 150 |
| Comp. Ex. 9 | — | — | 50 | 40 | 10 | — | — | " | 0.4 | 0.00 | 50 | 100 |

*1, *2, *3 and *4: See Table 1.

EXAMPLES 85 TO 108 AND COMPARATIVE EXAMPLES 10 TO 12

Thermoplastic resin compositions were obtained in the same manner as in Example 1 except that the copolymer rubber used in Example 1 was changed as shown in Table 4. The thus-obtained thermoplastic resin compositions were coated and evaluated for coating adhesion strength, in the same manner as in Example 1. The results obtained are summarized in Table 4.

TABLE 4

| Example | Modified Polyolefin | | | | Copolymer Rubber | | | | | Functional Group-Terminated Oligomer | | Accelerator | | OH content (wt %) | Coating Adhesion Strength (g/10 mm width) | |
|---|---|---|---|---|---|---|---|---|---|---|---|---|---|---|---|---|
| | PP1 | PP2 | PP3 | PP*1 | IIR | EPM2 | SEBS | SEPS1 | SEPS2 | Kind | Amount | Kind | Amount | | 50 mm/min | 1000 mm/min |
| Ex. 85 | 50 | — | — | — | 50 | — | — | — | — | HTBR1 | 3 | organotin*2 compound | 0.4 | 0.75 | 1050 | 350 |
| Ex. 86 | — | 40 | — | — | 60 | — | — | — | — | " | 3 | organotin*2 compound | 0.4 | 0.60 | 1100 | 400 |
| Ex. 87 | — | 50 | — | — | 50 | — | — | — | — | " | 3 | organotin*2 compound | 0.4 | 0.75 | 1200 | 500 |
| Ex. 88 | — | 60 | — | — | 40 | — | — | — | — | " | 3 | organotin*2 compound | 0.4 | 0.90 | 950 | 300 |
| Ex. 89 | 30 | 20 | — | — | 50 | — | — | — | — | " | 3 | organotin*2 compound | 0.4 | 0.75 | 1200 | 600 |
| Ex. 90 | 30 | 20 | — | — | 50 | — | — | — | — | ATBN | 3 | organotin*2 compound | 0.4 | 0.75 | 1000 | 400 |
| Ex. 91 | 30 | 20 | — | — | 40 | 10 | — | — | — | HTBR1 | 1 | organotin*2 compound | 0.4 | 0.75 | 900 | 350 |
| Ex. 92 | 30 | 20 | — | — | 40 | 10 | — | — | — | " | 3 | organotin*2 compound | 0.4 | 0.75 | 1500 | 750 |
| Ex. 93 | 30 | 20 | — | — | 40 | 10 | — | — | — | " | 5 | organotin*2 compound | 0.4 | 0.75 | 1000 | 600 |
| Ex. 94 | 30 | 20 | — | — | 40 | 10 | — | — | — | HTBR2 | 3 | organotin*2 compound | 0.4 | 0.75 | 1250 | 450 |
| Ex. 95 | 30 | 20 | — | — | 40 | 10 | — | — | — | HTBR3 | 3 | organotin*2 compound | 0.4 | 0.75 | 1150 | 500 |
| Ex. 96 | 30 | 20 | — | — | 40 | 10 | — | — | — | ATBN | 3 | organotin*2 compound | 0.4 | 0.75 | 1100 | 400 |
| Ex. 97 | 10 | — | — | 40 | 40 | 10 | — | — | — | HTBR1 | 3 | organotin*2 compound | 0.4 | 0.15 | 1050 | 450 |
| Ex. 98 | — | — | 10 | 40 | 40 | 10 | — | — | — | " | 3 | organotin*2 compound | 0.4 | 0.36 | 1200 | 650 |
| Ex. 99 | 30 | 20 | — | — | 40 | 10 | — | — | — | HTBR1 | 3 | tertiary*4 amine | 0.4 | 0.75 | 1350 | 500 |
| Ex. 100 | 30 | 20 | — | — | 40 | 10 | — | — | — | ATBN | 3 | tertiary*4 amine | 0.4 | 0.75 | 950 | 400 |
| Ex. 101 | 30 | 20 | — | — | 40 | 10 | — | — | — | HTBR4 | 3 | organotin*2 compound 1 | 0.4 | 0.75 | 1500 | 1900 |
| Ex. 102 | 30 | 20 | — | — | 40 | 10 | — | — | — | HTBR5 | 3 | organotin*2 compound 1 | 0.4 | 0.75 | 1450 | 2400 |
| Ex. 103 | 30 | 20 | — | — | 40 | 10 | — | — | — | HTBR6 | 3 | organotin*2 compound 1 | 0.4 | 0.75 | 1100 | 1300 |
| Ex. 104 | 30 | 20 | — | — | 40 | 10 | — | — | — | HTBR7 | 3 | organotin*2 compound 1 | 0.4 | 0.75 | 1300 | 1500 |
| Ex. 105 | 30 | 20 | — | — | 40 | 10 | — | — | — | HTBR8 | 3 | organotin*2 compound 1 | 0.4 | 0.75 | 1200 | 1500 |
| Ex. 106 | — | 50 | — | — | — | — | 50 | — | — | — | — | organotin*2 compound 1 | 0.4 | 0.80 | 1100 | 400 |
| Ex. 107 | 30 | 20 | — | — | — | — | — | 50 | — | HTBR1 | 3 | organotin*2 compound 1 | 0.4 | 0.80 | 1150 | 1400 |
| Ex. 108 | 30 | 20 | — | — | — | — | — | — | 50 | — | — | organotin*2 compound 1 | 0.4 | 0.80 | 1050 | 1400 |

TABLE 4-continued

| Example | Modified Polyolefin | | | | Copolymer Rubber | | | | | Functional Group-Terminated Oligomer | | Accelerator | | OH content (wt %) | Coating Adhesion Strength (g/10 mm width) | |
|---|---|---|---|---|---|---|---|---|---|---|---|---|---|---|---|---|
| | PP1 | PP2 | PP3 | PP*1 | IIR | EPM2 | SEBS | SEPS1 | SEPS2 | Kind | Amount | Kind | Amount | | 50 mm/min | 1000 mm/min |
| Comp. Ex. 10 | 30 | 20 | — | — | 40 | 10 | — | — | — | — | — | compound 1 organotin*2 | 0.4 | 0.75 | 350 | 400 |
| Comp. Ex. 11 | — | — | — | 50 | 40 | 10 | — | — | — | HTBR1 | 3 | compound 1 organotin*2 | 0.4 | 0.00 | 150 | 150 |
| Comp. Ex. 12 | — | — | — | 50 | 40 | 10 | — | — | — | — | — | compound 1 organotin*2 compound 1 | 0.4 | 0.00 | 50 | 100 |

*1, *2 and *4: See Table 1

While the invention has been described in detail and with reference to specific embodiments thereof, it will be apparent to one skilled in the art that various changes and modifications can be made therein without departing from the spirit and scope thereof.

What is claimed is:

1. A thermoplastic resin composition which comprises:
   (a) from 20 to 80 parts by weight of a resin component containing a modified polyolefin resin which has been graft-modified with an unsaturated hydroxy group-containing compound or an unsaturated carboxylic acid, wherein said unsaturated hydroxy group-containing compound or said unsaturated carboxylic acid is present in an amount of at least 0.1% by weight of the unmodified polyolefin resin,
   (b) from 80 to 20 parts by weight of a rubber component containing a copolymer rubber, and
   (c) a functional group-terminated oligomer in an amount of from 0.1 to 20 parts by weight per 100 parts by weight of the sum of components (a) and (b), wherein said functional group-terminated oligomer has a number average molecular weight of from 300 to 10,000.

2. The composition as claimed in claim 1, wherein said component (a) contains a modified polyolefin resin graft-modified with an unsaturated hydroxy group-containing compound.

3. The composition as claimed in claim 2, wherein the amount of hydroxyl groups contained in the unsaturated hydroxy group-containing compound incorporated in the modified polyolefin resin is 0.01% by weight or more in terms of hydroxyethyl methacrylate based on the sum of the resin components (a) and (b); wherein said amount is determined by the following formula:

$$\text{amount of hydroxyl group (wt \%)} = 130 \times A \times Y/M$$

wherein A is the number of hydroxyl groups contained in one molecule of the unsaturated hydroxy group-containing compound;
Y is an amount (wt %) of the unsaturated hydroxy group-containing compound based on the sum of the components (a) and (b); and
M is a molecular weight of the unsaturated hydroxy group-containing compound.

4. The composition as claimed in claim 1, wherein said component (a) contains a modified polyolefin resin graft-modified with an unsaturated carboxylic acid.

5. The composition as claimed in claim 4, wherein the amount of carboxyl groups contained in the unsaturated carboxylic acid incorporated in the modified polyolefin resin is 0.01% by weight or more in terms of acrylic acid based on the sum of components (a) and (b); wherein said amount is determined by the following formula:

$$\text{amount of carboxyl group (wt \%)} = 72 \times A' \times Y/M$$

wherein A' is the number of carboxyl groups contained in one molecule of the unsaturated carboxylic acid;
Y is an amount (wt %) of the unsaturated carboxylic acid based on the sum of the components (a) and (b); and
M is a molecular weight of the unsaturated carboxylic acid.

6. The composition as claimed in claim 1, wherein said component (b) contains an ethylene-α-olefin copolymer rubber.

7. The composition as claimed in claim 2, wherein said component (b) contains an ethylene-α-olefin copolymer rubber.

8. The composition as claimed in claim 4, wherein said component (b) contains an ethylene-α-olefin copolymer rubber.

9. The composition as claimed in claim 1, wherein said component (b) contains an isoprene-isobutylene copolymer rubber.

10. The composition as claimed in claim 2, wherein said component (b) contains an isoprene-isobutylene copolymer rubber.

11. The composition as claimed in claim 4, wherein said component (b) contains an isoprene-isobutylene copolymer rubber.

12. The composition as claimed in claim 1, wherein said functional group-terminated oligomer has an iodine value of 50 or less.

13. The compound as claimed in claim 1, wherein said functional group-terminated oligomer has a melting point of 40° to 100° C.

14. The composition as claimed in claim 1, which further comprises (d) a compound which accelerates the reaction of a hydroxyl group or a carboxyl group with an isocyanate group in an amount of from 0.005 to 10 parts by weight per 100 parts by weight of the sum of components (a) and (b), said compound (d) being at least one member selected from the group consisting of an organotin compound, a tertiary amine compound, a lead compound, a titanium compound, a cobalt compound, an aluminum compound, a zinc compound, an iron compound, an alkali metal salt of a carboxylic acid, and a bismuth compound.

15. The composition as claimed in claim 2, which further comprises (d) a compound which accelerates the reaction of a hydroxyl group or a carboxyl group with an isocyanate group in an amount of from 0.005 to 10 parts by weight per 100 parts by weight of the sum of components (a) and (b), said compound (d) being at least one member selected from the group consisting of an organotin compound, a tertiary amine compound, a lead compound, a titanium compound, a cobalt compound, an aluminum compound, a zinc compound, an iron compound, an alkali metal salt of a carboxylic acid, and a bismuth compound.

16. The composition as claimed in claim 4, which further comprises (d) a compound which accelerates the reaction of a hydroxyl group or a carboxyl group with an isocyanate group in an amount of from 0.005 to 10 parts by weight per 100 parts by weight of the sum of components (a) and (b), said compound (d) being at least one member selected from the group consisting of an organotin compound, a tertiary amine compound, a lead compound, a titanium compound, a cobalt compound, an aluminum compound, a zinc compound, an iron compound, an alkali metal salt of a carboxylic acid, and a bismuth compound.

17. A coated product produced by applying a urethane coating on a molded product obtained from a thermoplastic resin composition which comprises:
   (a) from 20 to 80 parts by weight of a resin component containing a modified polyolefin resin which has been graft-modified with an unsaturated hydroxy group-containing compound or an unsaturated carboxylic acid, wherein said unsaturated hydroxy group-containing compound or said unsaturated carboxylic acid is present in an amount of at least 0.1% by weight of the unmodified polyolefin resin, (b) from 80 to 20 parts by weight of a rubber component containing a copolymer rubber, and (c) a functional group-terminated oligomer in an amount of from 0.1 to 20 parts by weight per 100 parts by weight of the sum of components (a) and (b), wherein said functional group-terminated oligomer a number average molecular weight of from 300 to 10,000.

18. A thermoplastic resin composition as claimed in claim 1, wherein said unsaturated hydroxy group-containing compound or said unsaturated carboxylic acid is present in an amount of from 0.1 to 10% by weight of the unmodified polyolefin resin.

19. A coated product as claimed in claim 17, wherein said unsaturated hydroxy group-containing compound or said unsaturated carboxylic acid is present in an amount of from 0.1 to 10% by weight of the unmodified polyolefin resin.

* * * * *